United States Patent Office 3,780,086
Patented Dec. 18, 1973

3,780,086
PROCESS FOR PRODUCING ADIPONITRILE BY DIMERIZATION ON AN AMALGAM
Freddy Marechal, Wezembeek-Oppen, and Henri Lefebvre, Jemeppe-sur-Sambre, Belgium, assignors to Solvay & Cie, Brussels, Belgium
No Drawing. Filed June 29, 1971, Ser. No. 158,054
Claims priority, application France, June 29, 1970, 7024085
Int. Cl. C07c *121/26*
U.S. Cl. 260—465.8 A                                6 Claims

ABSTRACT OF THE DISCLOSURE

A high effective rate of utilization of the active metal of an amalgam used in dimerization or polymerization reactions is obtained by removing the chromium and nickel ions from the liquid phase containing the material to be dimerized or polymerized prior to contact thereof with the amalgam.

BACKGROUND OF THE INVENTION

The present invention relates to a process for obtaining a high effective rate of utilization of the active metal of an amalgam used as the reagent in dimerization and polymerization reactions.

The process of the invention is particularly applicable to installations intended for the dehalogenating dimerization of a halogenated propionitrile with an amalgam in the presence of specific solvents, as described in U.S. Pat. No. 3,536,747, issued Oct. 27, 1970 and British Pat. No. 1,217,996 of Mar. 24, 1969, both assigned to Solvay & Cie.

It is also applicable to the hydrogenating dimerization of acrylonitrile to form adiponitrile. One method of effecting this reaction is described in French Pat. No. 1,485,903 of June 30, 1966 issued to Imperial Chemical Industries.

In these processes, unsaturated and/or halogenated nitriles are dimerized in contact with an alkali or alkaline earth metal amalgam.

In Belgian Pat. No. 715,869 of May 30, 1968, issued to Solvay & Cie, a process and apparatus have been disclosed which are useful for carrying out dimerization and polymerization reactions continuously by means of an amalgam flowing by gravity along a perfectly smooth, vertical or sharply inclined surface. As is known, amalgams tend to break up into droplets, and it is difficult to make such droplets coalesce. Thus, numerous precautions are generally taken to insure the perfect adhesion of the amalgam to its support surface, such as the use of a material which is readily wettable by amalgams for the construction of this surface and also the scouring and polishing of the support surface before it is used.

It has been found that despite these arrangements, certain breaks in the continuity of the amalgam may still occur during the continuous operation of dimerization and polymerization installations involving the recycling of the liquid reaction phase after separation of the dimerization or polymerization product.

The amalgam first assumes a granular appearance; subsequently, the dissociation of phenomenon of the amalgam becomes more prominent to such an extent that the amalgam becomes detached from its surface support due to the difference in surface tension between the amalgam and mercury and may even cause the complete cessation of the reaction. While the danger of detachment of the amalgam from its support surface does not arise in installations where the amalgam is introduced as a shower from the top of the reactor or directly into a layer of mercury, nevertheless, the dissociation phenomenon of the amalgam with a concomitant loss of active metal and consequently a reduction of the overall output of the installation, occurs nevertheless.

SUMMARY OF THE INVENTION

A method has now been discovered whereby the losses of active metal of an amalgam used as the reagent in dimerization and polymerization reactions may be avoided.

It has been discovered, surprisingly, that chromium and to a lesser extent nickel affect the stability of the amalgam and consequently the effective rate of utilization of the active metal of the amalgam, whereas the presence of other ions such as those of copper and iron have no influence with respect to the amalgam stability.

According to the invention, the liquid reaction phase of a dimerization or polymerization reaction which contans an organic compound to be dimerized or polymerized in contact with an amalgam is purified, prior to contacting the amalgam, to remove chromium and nickel ions so as to insure a concentration of these ions below 1 p.p.m. by weight in the liquid phase in the dimerization or polymerization reactors.

DESCRIPTION OF THE INVENTION

According to the present invention, the chromium and nickel ions in the liquid recycling phase which contains a compound to be dimerized or polymerized may be removed by any known process for separating chromium and nickel.

Advantageously, the process of the invention may be carried out by circulating the liquid recycling phase through a layer of ion exchange resins of the strong acid cationic type. It is useful to include two identical resin columns on the recycling liquid circuit downstream of the dimerization or polymerization reactor. In this way, the first column can be used to purify the recycling solution while the second column is being regenerated.

The contaminating ions may be picked up in the liquid phase by corrosion of the metallic parts of the installation. In order to limit the stress on the cation exchange resin as much as possible, it is desirable to reduce the contact between the liquid phase of the dimerization or polymerization reaction and the metallic materials during the operations preceding the dimerization or polymerization. This can be done for example by treating the metallic parts of the installation with some corrosion-resistance resins such as for example, phenoplasts. However, even with such precautionary measures, some corrosion still occurs at the "hot points" of the treatment of the crude dimerization mixture such as in the evaporation or distillation zones of the process described in Canadian Pat. No. 860,962 which corresponds to the copending U.S. application Ser. No. 45,724, filed on June 12, 1970 and issued as U.S. Pat. 3,711,078 on Jan. 26, 1973 and which, together with all publications mentioned herein, is incorporated by reference.

Any strong acid cation exchange resin can be used; a wide variety of these materials are available commercially and have been described in the Encyclopedia of Polymer Science and Technology, Interscience Publishers, 1967, p. 696.

The particular amount of ion exchange resin will of course depend on the quantity of ions to be eliminated and on the total capacity of the resin, as well as the flow of the liquid recycling phase and can be readily determined for any particular resin, in combination with the particular dimerization or polymerization process involved.

As pointed out above, any method for separating chromium and nickel ions can be used to carry out the present process, for example, gravimetric separation by precipitation of the corresponding hydroxides at a pH close to 8, as disclosed for example, by Esetr. de G. Charlot et d. Bézier, Méthodes Modernes d'Analyse Quantitative Minérale, ed.: Masson et Cie, pp. 247 and 248.

The following example illustrates the best mode currently contemplated for carrying out the invention, but must not be construed as limiting the invention in any manner.

EXAMPLE

This example concerns the dechlorinating dimerization of β-chloropropionitrile dissolved in dimethyl sulfoxide which is carried out by contacting a sodium amalgam flowing at high speed along a vertical support surface in an installation in which the equipment used for the treatment of the organic liquid phase before recycling is composed essentially of stainless chromium steel. Hence, the impurity in the liquid phase is chromium.

The dimerization is carried out in accordance with the example in Canadian Pat. No. 860,962 and the corresponding U.S. application, Ser. No. 45,724 which issued on Jan. 16, 1973 as U.S. Pat. 3,711,078.

The broth continuously taken from the dimerizer contains acrylonitrile, propionitrile, β-chloroproponitrile, adiponitrile, water dimethyl sulfoxide and finally sodium chloride trimers, and various impurities. After centrifuging and washing the salt with propionitrile, the washing liquid and the organic phase separated from the broth are combined and passed to an installation in which the adiponitrile is separated from the light products. The latter are then in turn combined and constitute the liquid recycling phase.

The thus obtained liquid recycling phase is then contacted with an ion exchange resin of the strong acid cationic type before being introduced into the dimerization reactor where it is mixed with the fresh reagents. The residence time of the liquid phase in the purification column is adjusted so as to insure a concentration of chromium ions of the order to 0 to 1 p.p.m. by weight at the inlet of the dimerizer. In the present example, the resin Amberlite IR 120, is used in a bed volume of 10 l. having a diameter to height relationship of 25. The residence time is 2.5 hours for a flow of the recycling phase of 4 l., i.e. 0.4 times the bed volume/hr.

After operating for 30 days under these conditions, the effective utilization rate of the sodium is still higher than 90% and it is not possible to observe any deterioration of the surface of the amalgam.

On the other hand, when the liquid recycling phase is returned to the dimerization reactor without previous purification, the content of chromium ions increases rapidly therein. When this content attains only 10 p.p.m. at the inlet of the dimerizer, which corresponds to a concentration higher than 1 p.p.m. in the dimerization reactor after dilution with fresh reagents, complete deamalgamation of the electrode is found within 48 hours.

Comparative tests of the continuous dimerization of β-chloropropionitrile by means of a sodium amalgam in dimethyl sulfoxide with liquid recycling phases containing respectively, 100 p.p.m. copper, iron, nickel and chromium ions, have shown that when iron or copper ions are present, the effective rate of utilization of the sodium is constant, whereas the presence of nickel and chromium ions cause a reduction of this rate to about one-tenth of its original value respectively within 5 and 2 hours.

What we claim as new and desire to secure by Letters Patent is:

1. A process for improving the effective rate of utilization of the alkali metal or alkaline earth metal of an amalgam used in adiponitrile production by dehalogenating dimerization in which a β-halogenated propionitrile in a liquid substantially organic phase comprsing chromium and nickel ions is contacted with an alkali metal or alkaline earth metal amalgam, which comprises removing chromium and nickel ions from said liquid substantially organic phase containing said β-halogenated propionitrile and said chromium and nickel ions prior to contacting said liquid phase with said alkali metal or alkaline earth metal amalgam so as to maintain the concentration of chromium and nickel ions respectively below 1 p.p.m. by weight in said liquid substantially organic phase during the dimerization reaction.

2. A process according to claim 1 in which said nickel and chromium ions are removed from said liquid substantially organic phase by means of cation exchange.

3. A process according to claim 1 in which the β-halogenated propionitrile is β-chloropropionitrile.

4. Process according to claim 1 in which said liquid substantially organic phase is comprised of dimethylsulfoxide.

5. In a process for producing adiponitrile by dehalogenating dimerization of β-halogenated propionitrile by means of an alkali metal or alkaline earth metal amalgam, said β-halogenated propionitrile being in a liquid substantially organic phase containing nickel and chromium ions, wherein the crude mixture resulting from said dehalogenating dimerization which comprises an organic liquid phase containing adiponitrile product and propionitrile by-product and a solid alkali metal or alkaline earth metal salt is separated into said organic liquid phase and a solid phase comprised of said salt, said organic liquid phase is distilled to separate and recover adiponitrile product and said propionitrile by-product, said solid phase is washed in order to recover the liquid organic products which are impregnated on said solid phase by means of a washing liquid consisting of said propionitrile by-product which has been separated and recovered and the liquid recovered from said washing is added to said organic liquid phase prior to said distilling, the improvement which comprises improving the effective rate of utilization of the alkali metal or alkaline earth metal of said amalgam by removing chromium and nickel ions from the liquid substantially organic phase containing said β-halogenated propionitrile and said chromium and nickel ions prior to contacting said liquid phase with said alkali metal or alkaline earth metal amalgam so as to maintain the concentration of chromium and nickel ions respectively below 1 p.p.m. by weight in said liquid substantially organic phase of the dimerization reaction.

6. A process according to claim 5, in which said nickel and chromium ions are removed from said liquid substantially organic phase by means of cation exchange.

References Cited

UNITED STATES PATENTS

| | | | |
|---|---|---|---|
| 3,193,574 | 7/1965 | Katchalsky et al. | 260—465.8 A |
| 3,536,747 | 10/1970 | Mathis et al. | 260—465.8 A |
| 3,625,657 | 12/1971 | Mathis et al. | 260—465.8 A X |
| 3,641,105 | 2/1972 | Hashiguchi et al. | 260—465.8 A |

JOSEPH P. BRUST, Primary Examiner

U.S. Cl. X.R.

260—465.1, 465.9